INVENTOR.
Donald D. Sloan
BY
Roberts, Cushman & Grover
ATT'YS

United States Patent Office 3,469,916
Patented Sept. 30, 1969

3,469,916
PHOTOGRAPHIC COPYING APPARATUS
Donald D. Sloan, Weston, Mass., assignor to Dennison Manufacturing Company, Framingham, Mass., a corporation of Nevada
Filed Oct. 12, 1966, Ser. No. 586,206
Int. Cl. G03b 27/70
U.S. Cl. 355—51
2 Claims

ABSTRACT OF THE DISCLOSURE

Apparatus of the type which projects light along a path which is elongate transversely of the path and which has a mask in the path of the projected light. The mask has an opening which is narrower in the middle than at the ends to obstruct light more in the middle than at the ends thereby to afford uniform illumination throughout the exposure window.

---

This invention relates to copying apparatus of the continuous-projection type in which the record to be copied and the copy material travel in synchronism in spaced relationship while projecting an image from the record to the copy material along a path which has an elongate cross-section transversely of the paths of the record and copy material. In such apparatus the distance from the record to copy material at the ends of the elongate path is greater than at the middle so that the copy material tends to be underexposed at said ends and, unless the apparatus is made with precision, one end of the path is often longer than the other end of the path so that there is also inequality between the exposures at the two ends of the path.

Objects of the present invention are to provide apparatus which corrects the aforesaid inequalities, which is simple and economical to produce, which is easy to operate and maintain, and which is durable and reliable in use.

The present invention involves a mask projecting into the aforesaid path from one of the longer sides, the mask obstructing more light in the middle than at the ends of the elongate path, thereby to correct the tendency toward underexposure at the ends of the elongate beam. To correct for any inequality of the length of path between the ends of the elongate cross-section the mask may be tilted about an axis extending longitudinally of the path intermediate said ends.

For the purpose of illustration a typical embodiment of the invention is shown in the accompanying drawings in which.

Figure 1:
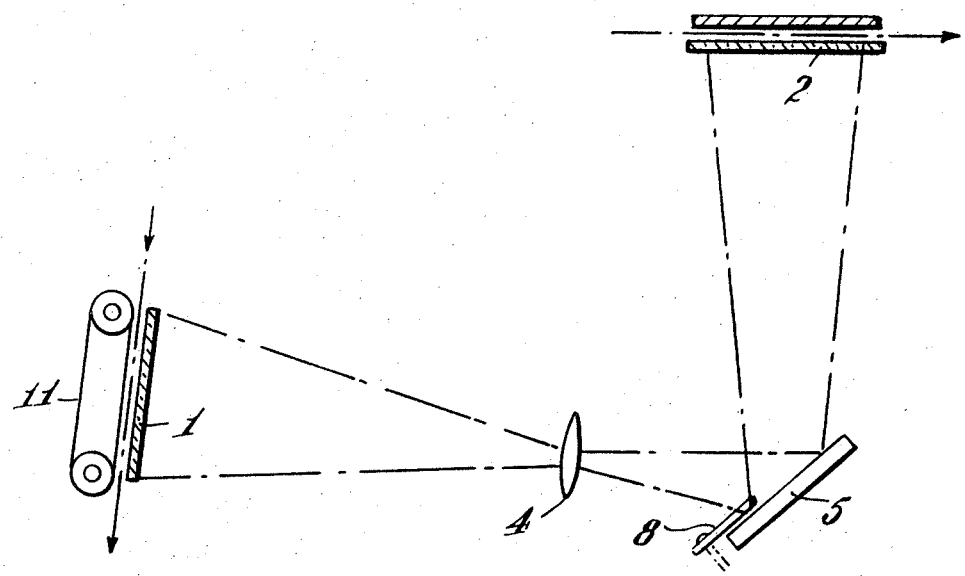
FIG. 1 is a diagrammatic view of an optical system.
Figure 2:
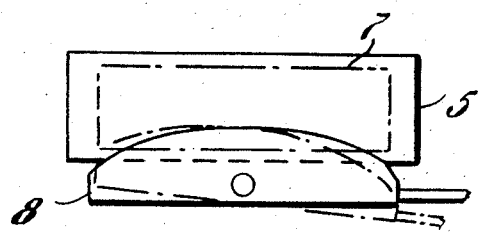
FIG. 2 is a view from line 2—2 of FIG. 1.

The particular embodiment of the invention chosen for the purpose of illustration comprises a record gate 1 for a record to be copied, an exposure window 2 in which the paper or other copy material is exposed, the record being illuminated by lamp 3 and an image of the record being projected to the material by a lens 4 and mirror 5. Preferably the light beam has an elongate rectangular shape such as shown at 7 in FIG. 2. With an elongate beam the intensity of light decreases from the center toward the ends of the beam. To compensate for this decrease a mask 8 is disposed in the beam, the mask being shaped as shown in FIG. 2 to obstruct light in gradually decreasing degrees from the center toward each end. The mask is pivoted at 9 to swing about an axis perpendicular to the mirror so that, by tipping the mask about the axis, correction may be made for any slight misalignment of either of the windows or the mirror which results in a distance from record to copy material at one end of the elongate beam which is greater than at the other end.

I claim:

1. Photographic copying apparatus comprising record and copy windows spaced apart along an optical path, means for moving a record past the record window, means for moving copy material past the copy window, means for projecting an image from the record window to the copy window, while the record and copy material are moving, along a path which is elongate transversely of the path so that the distance from the record to copy material at the ends of the elongate path is greater than at the middle and the copy material therefore tends to be underexposed at said ends, a mask projecting into said path from one of the longer sides, the mask being shaped to obstruct light more in the middle than at the ends of the elongate path, and means for adjusting the mask to vary the distribution of light transversely of the path.

2. Photographic copying apparatus according to claim 1 further characterized by means for tilting said mask about an axis extending longitudinally of the path intermediate said ends.

References Cited

UNITED STATES PATENTS 2,431,612 11/1947 Furnas.
3,042,795 7/1962 Kron _____ 240—46.49 X NORTON ANSHER, Primary Examiner
WAYNE A. SIVERTSON, Assistant Examiner U.S. Cl. X.R.
355—66, 67